United States Patent

Michizono et al.

[11] Patent Number: 6,029,219
[45] Date of Patent: Feb. 22, 2000

[54] ARBITRATION CIRCUIT FOR ARBITRATING REQUESTS FROM MULTIPLE PROCESSORS

[75] Inventors: Masatoshi Michizono; Toshiyuki Muta; Koichi Odahara; Yasutomo Sakurai; Shinya Katoh, all of Kawasaki, Japan

[73] Assignee: Fujitsu Limited, Kawasaki, Japan

[21] Appl. No.: 09/030,279

[22] Filed: Feb. 25, 1998

[30] Foreign Application Priority Data

Aug. 29, 1997 [JP] Japan ................................ 9-235011

[51] Int. Cl.[7] .................................................. G06F 13/14
[52] U.S. Cl. .............................. 710/111; 710/41; 710/116
[58] Field of Search ........................... 710/41, 44, 111, 710/120, 241, 243, 48, 49, 262, 263, 266, 42, 116

[56] References Cited

U.S. PATENT DOCUMENTS

| | | | |
|---|---|---|---|
| 5,519,837 | 5/1996 | Tran | 710/111 |
| 5,564,062 | 10/1996 | Meaney et al. | 710/111 |
| 5,583,999 | 12/1996 | Sato et al. | 710/111 |
| 5,640,519 | 6/1997 | Lagendorf et al. | 710/111 |

FOREIGN PATENT DOCUMENTS

| | | |
|---|---|---|
| 52-72131 | 6/1977 | Japan . |
| 54-140845 | 11/1979 | Japan . |
| 58-192150 | 11/1983 | Japan . |
| 3-22034 | 1/1991 | Japan . |
| 3-53339 | 3/1991 | Japan . |

*Primary Examiner*—Glenn A. Auve
*Attorney, Agent, or Firm*—Staas & Halsey LLP

[57] ABSTRACT

A round robin arbitration circuit arbitrating N requests has a register storing one of N values, a priority encoder selecting one of N priority patterns according to the value in the register and assigning priorities to the requests based on the selected priority pattern, thereby conducting arbitration between the requests, a circuit updating the value in the register among the N values in a predetermined order synchronously with the arbitration, and a circuit updating the value in the register among the N values in the predetermined order at regular intervals that are asynchronous with the arbitration. At the regular intervals that are asynchronous with the arbitration, a jump is made in the predetermined updating order of the values to be set in the register. Accordingly, even if live-lock occurs, it will be solved when such a jump is made to make the number of priority patterns disagree with the number of requests issued in a loop.

26 Claims, 10 Drawing Sheets

Fig.1

|  | REQUEST SOURCE NO. | |
|---|---|---|
|  | HIGHEST PRIORITY | LOWEST PRIORITY |
| PATTERN 0 | 0 > 1 > 2 --- > N − 1 | |
| 1 | N − 1 > 0 > 1 --- > N − 2 | |
| ⋮ | ⋮ | |
| N − 1 | 1 > 2 > 3 --- > 0 | |

Fig. 5

↑ : TRANSITION ON COUNT ENABLE SIGNAL

| PRIORITY SELECTOR COUNTER | 0 | →↑ 1 | →↑ 2 | →↑ 3 | →↑ 4 | →↑ 5 | →↑ 6 | →↑ 7 ↑ |
|---|---|---|---|---|---|---|---|---|
| HIGHEST PRIORITY ↑ | 0 | 1 | 2 | 3 | 4 | 5 | 6 | 7 |
| | 1 | 2 | 3 | 4 | 5 | 6 | 7 | 0 |
| | 2 | 3 | 4 | 5 | 6 | 7 | 0 | 1 |
| | 3 | 4 | 5 | 6 | 7 | 0 | 1 | 2 |
| | 4 | 5 | 6 | 7 | 0 | 1 | 2 | 3 |
| | 5 | 6 | 7 | 0 | 1 | 2 | 3 | 4 |
| | 6 | 7 | 0 | 1 | 2 | 3 | 4 | 5 |
| ↓ LOWEST PRIORITY | 7 | 0 | 1 | 2 | 3 | 4 | 5 | 6 |

| ENCODE⟨2:0⟩ | | | PRIORITY SELECTOR COUNTER |
|---|---|---|---|
| 2 | 1 | 0 | |
| 0 | 0 | 0 | 1 |
| 0 | 0 | 1 | 2 |
| 0 | 1 | 0 | 3 |
| 1 | 0 | 0 | 4 |
| 1 | 0 | 1 | 5 |
| 1 | 1 | 0 | 6 |

Fig.12a

MODE SIGNAL OF "1"

| ROUNDROBIN COUNTER | 1 | 2 | 3 | 4 | 5 | 6 |
|---|---|---|---|---|---|---|
| PRIORITY HIGH ↑ ↓ LOW | MODULE 2-31<br>MODULE 2-32<br>MODULE 2-33<br>MODULE 2-34<br>MODULE 2-35<br>MODULE 2-36 | MODULE 2-32<br>MODULE 2-33<br>MODULE 2-34<br>MODULE 2-35<br>MODULE 2-36<br>MODULE 2-31 | MODULE 2-33<br>MODULE 2-34<br>MODULE 2-35<br>MODULE 2-36<br>MODULE 2-31<br>MODULE 2-32 | MODULE 2-34<br>MODULE 2-35<br>MODULE 2-36<br>MODULE 2-31<br>MODULE 2-32<br>MODULE 2-33 | MODULE 2-35<br>MODULE 2-36<br>MODULE 2-31<br>MODULE 2-32<br>MODULE 2-33<br>MODULE 2-34 | MODULE 2-36<br>MODULE 2-31<br>MODULE 2-32<br>MODULE 2-33<br>MODULE 2-34<br>MODULE 2-35 |

Fig.12b

MODULE SIGNAL OF "0" (ACTUAL APPEARANCE IN OPERATION)

| ROUNDROBIN COUNTER | 1 | 2 | 3 |
|---|---|---|---|
| PRIORITY HIGH ↑ ↓ LOW | MODULE 2-31<br>MODULE 2-32<br>MODULE 2-33 | MODULE 2-32<br>MODULE 2-33<br>MODULE 2-31 | MODULE 2-33<br>MODULE 2-31<br>MODULE 2-32 |

ARBITRATION CIRCUIT FOR ARBITRATING REQUESTS FROM MULTIPLE PROCESSORS

BACKGROUND OF THE INVENTION

1. Field of the Invention

The present invention relates to a round robin arbitration circuit for arbitrating requests that are issued from multiple processors, installed with memories, in an information processor.

2. Description of the Related Art

A round robin arbitration circuit according to a prior art for arbitrating requests issued from N request sources has a priority encoder. The priority encoder uses N priority patterns (from 0 to N−1) to assign different priorities to the requests.

After conducting arbitration to select one of the requests, the priority encoder selects, for the next arbitration, one of the N priority patterns that assigns the lowest priority to the request source whose request has just been selected.

This prior art causes live-lock due to the masking and priority changing of requests. The term "live-lock" means a situation in which, although the arbitration circuit is operating, the selection of a specific request waits to be arbitrated without being executed by the arbitration circuit and, therefore, the request is locked. The live-lock may last perpetually depending on the program.

A round robin arbitration circuit according to a prior art for arbitrating N requests has a register for storing one of N values and a priority encoder for selecting one of N priority patterns according to the value in the register. After assigning priorities to the N requests according to the priority pattern specified by the value in the register, the arbitration circuit updates the value in the register among the N values according to a predetermined order.

This prior art may prevent live-lock caused by the reason mentioned above. This prior art, however, cyclically uses the arbitration patterns. If a program to be executed has a loop that issues requests cyclically and if the cycle of the requests match with the cycle of the arbitration patterns, the program will cause live-lock.

It is required, therefore, to provide a round robin arbitration circuit capable of surely arbitrating requests that ask for a resource or a data bus without live-lock or deadlock.

Before describing the embodiments of the present invention, the prior art and the disadvantages thereof will be described with reference to the related figures.

FIG. 1 shows an arbitration technique of a priority encoder of a round robin arbitration circuit according to the prior art. There are N request sources, and the priority encoder has N priority patterns (from 0 to N−1) for assigning priorities to the N request sources, respectively.

After conducting arbitration to select one of the N request sources, the priority encoder selects, for the next arbitration, one of the N priority patterns that assigns the lowest priority to the request source that has just been selected. If, in FIG. 1, the priority encoder selects a priority pattern 0 to assign the highest priority to a request source 0 and the lowest priority to a request source N−1, it selects in the next arbitration a priority pattern N−1 to assign the lowest priority to the request source 0 that has received the highest priority in the preceding arbitration.

If several requests compete for a resource, some requests must be masked. For example, if several requests ask for the same memory, only one of the requests is made active and the others are masked. The masked requests are excluded from arbitration which is conducted among the other requests. This technique may cause live-lock.

This kind of live-lock will be explained with reference to FIG. 2. There are requests a, b, and c in which the requests a and b are repeatedly issued and the requests b and c ask for the same resource. Priorities assigned to these requests are as shown in each period.

In period 1, the requests a and b occur first, and therefore, the request a is selected according to a priority pattern of c>a>b.

In period 2, the request a selected in the period 1 is executed. The period 2 has a priority pattern of b>c>a with the selected request a having the lowest priority. Then, the request b is selected between the requests b and c.

In period 3, the request b selected in the period 2 is executed. During the execution of the request b, the request c is masked because it needs the same resource as the request b. The masked state is indicated with a dotted line in FIG. 2. This period 3 has a priority pattern of c>a>b with the request b selected in the period 2 having the lowest priority. Although the request c has the highest priority, the request a is selected because the request c is masked in the period 3.

In period 4, the request a selected in the period 3 is executed. The period 4 has a priority pattern of b>c>a with the request a selected in the period 3 having the lowest priority. As a result, the request b is selected in the period 4.

Thereafter, period 5 has the same state as the period 3. Then, the states of the periods 3 and 4 are repeated to cause live-lock. This kind of live-lock is caused by masking requests and changing priorities assigned to requests. The livelock may last perpetually depending on the program. If the requests a and b are issued from a polling loop of a program for detecting a change in a flag and if the request c is an access request to change the flag, the periods 3 and 4 will be repeated perpetually in the program.

A round robin arbitration circuit for arbitrating N requests according to a prior art will be explained. The arbitration circuit has a register for storing one of N values and a priority encoder for providing one of N priority patterns according to the value in the register. After assigning priorities to requests according to a priority pattern specified by the value in the register, the arbitration circuit updates the value in the register among the N values according to predetermined order.

This prior art may prevent the live-lock caused by the reasons mentioned above. This prior art, however, cyclically uses the priority patterns. If a program has a loop that cyclically issues requests for an exclusive right, and if the cycle of the requests is synchronous with the cycle of the priority patterns when the program is executed, live-lock will occur.

This type of livelock will be explained with reference to FIG. 3. Suppose that a device CPUa serving as a request source repeatedly uses a resource in a program, and a device CPU serving as another request source repeats a polling operation to detect a free time of the resource so that the device CPU may use the resource. If the device CPU can successfully use the resource, the repetitive use of the resource by the device CPUa is released.

If the polling operation by the device CPU is carried out while the device CPUa is using the resource, the device CPU will perpetually be unable to use the resource, to cause live-lock in which the devices CPUa and CPU endlessly loop.

The start and end of use of a given resource is controlled under a flag set in a memory shared by all devices (CPUs). Generally, accesses to the flag from the devices are arbitrated according to a round robin arbitration system, which intentionally disturbs the accesses not to cause live-lock. However, live-lock sometimes occurs due to the following two reasons:

(1) If the devices spontaneously access the flag without competition or without the influence of arbitration, the live-lock mentioned above will occur only when access timing based on a program matches with live-lock causing timing. This problem must be solved in the program.

(2) If accesses to the flag from the devices occur in a program loop and compete with one another and if the number of the accesses is equal to the number of priority patterns of the round robin arbitration system, arbitration will not disturb the selection of the priority patterns. As a result, the same access will always be selected in every cycle of the program loop. For example, in FIG. 3, only the device CPUa uses the resource and the device CPU is unable to detect a free time of the resource, and therefore, is unable to use the resource perpetually, to cause live-lock. This live-lock causes a problem that an exclusive right is not evenly distributed to request sources such as CPUs or any other devices.

If a request is masked on condition that a related request must be met first, live-lock will occur. For example, when updating blocks of a cache memory, a read request for a block and a discharge-write request for another block may be issued through separate request lines. In this case, it is preferable to process the read request before the write request in view of the performance of a system. Therefore, the write request is masked until the read request is processed.

If the highest priority is assigned to the masked write request, there will be no change in the priority patterns, to conduct fixed priority arbitration. If, at this moment, the read request that releases the masked write request has the lowest priority and if a request source that constantly issues requests is present at a higher priority position than the read request, the read request will not be selected perpetually. This kind of live-lock will occur when a CPU issues a write request for releasing an exclusive right flag and another CPU issues a test (read) and set request for the same flag, because the read request is selected before the write request for the flag.

SUMMARY OF THE INVENTION

An object of the present invention is to provide an arbitration circuit that causes no live-lock in conducting arbitration.

In order to accomplish the object, a first aspect of the present invention provides an arbitration circuit, for arbitrating N requests, having a memory circuit storing one of N values, a priority circuit selecting one of N priority patterns according to the value in the memory circuit and assigning priorities to the requests based on the selected priority pattern, thereby conducting arbitration between the requests, a circuit updating the value in the memory circuit among the N values in predetermined order synchronously with the arbitration, and a circuit updating the value in the memory circuit among the N values in the predetermined order at regular intervals that are asynchronous with the arbitration.

The first aspect updates the value in the memory circuit among the N values synchronously with arbitration and, when updating the value in the memory circuit, makes a jump in the predetermined order of the N values at regular intervals that are asynchronous with arbitration. Even if the number of the priority patterns agrees with the number of requests issued in a loop of a program to cause live-lock, the live-lock is solved when a jump is made in the predetermined order of the N values to asynchronously update the value in the memory circuit, because the number of priority patterns disagrees with the number of requests at this moment.

A second aspect of the present invention provides an arbitration circuit, for arbitrating N requests, having a memory circuit storing one of N values, a priority circuit selecting one of N priority patterns according to the value in the memory circuit and assigning priorities to the requests based on the selected priority pattern, thereby conducting arbitration between the requests, a circuit updating the value in the memory circuit among the N values in predetermined order synchronously with the arbitration, and a circuit updating the value in the memory circuit to a predetermined value at regular intervals that are asynchronous with the arbitration.

The second aspect updates the value in the memory circuit among the N values synchronously with arbitration, and without regard to the predetermined order of the N values, changes the value in the memory circuit to a predetermined one of the N values at regular intervals that are asynchronous with arbitration. Thereafter, the value in the memory circuit is updated among the N values in the predetermined order. Even if the number of the priority patterns agrees with the number of requests issued in a loop of a program to cause live-lock, the live-lock is solved when a jump is made in the predetermined order of the N values to asynchronously update the value in the memory circuit. At this moment, the number of priority patterns is deviated from the number of requests, to solve the livelock.

A third aspect of the present invention provides a round robin arbitration circuit, for arbitrating N requests, having a memory circuit storing one of N values, a priority circuit selecting one of N priority patterns according to the value in the memory circuit and assigning priorities to the requests based on the selected priority pattern, thereby conducting arbitration between the requests, a circuit updating the value in the memory circuit among the N values, in a predetermined order, synchronously with the arbitration, and an inhibition circuit inhibiting the updating of the value in the memory circuit if the requests involve a masked request and if the highest priority is assigned to the masked request by the arbitration.

The third aspect updates the value in the memory circuit among the N values synchronously with arbitration. However, if a masked request receives the highest priority by arbitration, the third aspect inhibits the updating of the memory circuit. Then, the request keeps the highest priority for the next arbitration, and therefore, the request is surely given a chance to be picked up without being left behind other requests.

BRIEF DESCRIPTION OF THE DRAWINGS

The above object and features of the present invention will be more apparent from the following description of the preferred embodiments with reference to the accompanying drawings, wherein:

FIG. 1 shows an arbitration technique of a priority encoder according to the prior art;

FIG. 5 shows a table of logic values in a priority encoder of FIG. 4;

FIG. 12a and FIG. 12b show relationships between values in the counter of FIG. 9 and priority patterns.

DESCRIPTION OF THE PREFERRED EMBODIMENTS

The preferred embodiments of the present invention will now be explained with reference to the remaining drawings.

Figure 4:
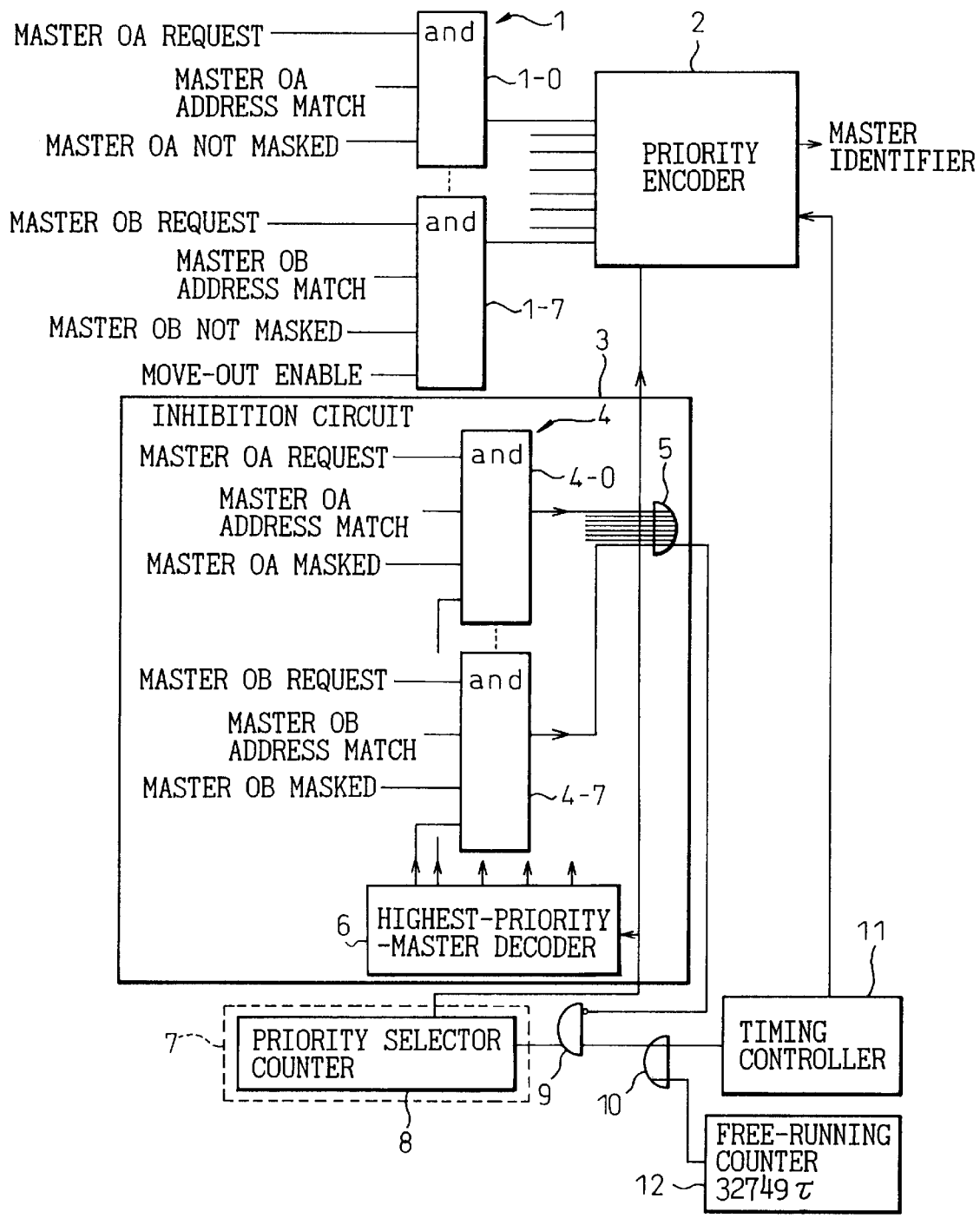
FIG. 4 shows an arbitration circuit according to an embodiment of the present invention.

FIG. 4 shows a round robin arbitration circuit according to an embodiment of the present invention. Although the circuit has eight request sources (masters) in FIG. 4, the number of the request sources (masters) is optional.

An AND gate 1 for testing request conditions is arranged for each of the request sources. Among eight AND gates 1-0 to 1-7, FIG. 4 shows the first and eighth AND gates 1-0 and 1-7. A priority encoder 2 assigns priorities to requests sent from the AND gates 1 and provides an identifier to indicate a selected request having the highest priority. The details of the priority encoder 2 will be explained later.

A register 7 specifies a priority pattern to be selected by the priority encoder 2 and has a 3-bit priority selector counter 8.

A timing controller 11 controls the timing of arbitration to be conducted by the priority encoder 2. A timing signal from the timing controller 11 is supplied to the priority encoder 2 and to the priority selector counter 8 through an OR gate 10 and an AND gate 9.

The other input terminal of the OR gate 10 receives an output signal from a free-running counter 12 that counts up to in 32749 clocks, where 32749 is a prime number. The other input terminal of the AND gate 9 receives an output signal from an inhibition circuit 3.

The inhibition circuit 3 generates an inhibition signal on predetermined conditions, to inhibit the updating of the priority selector counter 8. The inhibition circuit 3 has circuits 4 and 5 detecting a request that has the highest priority and is masked. The inhibition circuit 3 also has a decoder 6 detecting a request having the highest priority. The circuit 4 is an AND gate, which is arranged for each of the eight requests, to determine if the corresponding request is present, if the request is addressed to the arbitration circuit, if the request is masked, and if the request has the highest priority. Output signals from the AND gates 4 are supplied to the AND gate 9 through the OR gate 5.

The AND gate 9 provides a count enable signal to advance a count in the priority selector counter 8.

The operation of the arbitration circuit of FIG. 4 will be explained.

Each AND gate 1 checks an address attached to the corresponding request to see if the request is for the arbitration circuit and, at the same time, determines whether the request is masked because, for example, a resource to be accessed by the request is busy. If the request is executable, the AND gate 1 transfers the request to the priority encoder 2. A move-out enable signal to the eighth AND gate 1-7 will be explained later.

FIG. 5 shows a table of logic values in the priority encoder 2. The priority encoder 2 selects a priority pattern according to a value in the priority selector counter 8 and, based on the selected priority pattern, arbitrates requests. If the value in the counter 8 is, for example, 0, the highest priority is assigned to a request 0 and the lowest priority to a request 7. Among input requests, the priority encoder 2 selects the one having the highest priority and provides an identifier to indicate the selected request.

The value in the counter 8 is updated according to a predetermined order as indicated with arrow marks in FIG. 5 in response to the count enable signal from the AND gate 9. If inhibition circuit 3 provides no output signal, the value in the counter 8 is updated in response to a signal from the timing controller 11 upon the completion of arbitration conducted by the priority encoder 2.

Figure 2:
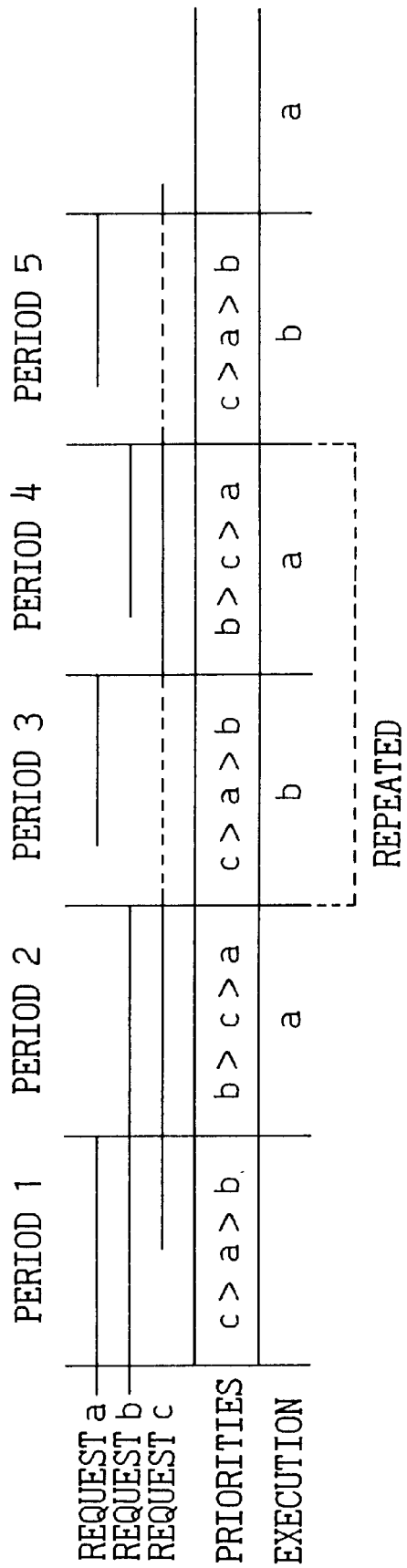
FIG. 2 explains live-lock occurring in the prior art.

In this way, the value in the counter 8 is updated according to the predetermined order, and therefore, every request receives a change of being selected without being left behind other requests even if the request is masked due to a preceding request or due to controlling conditions. Consequently, the live-lock of FIG. 2 due to the masking of a request will not occur in the present invention.

Figure 3:
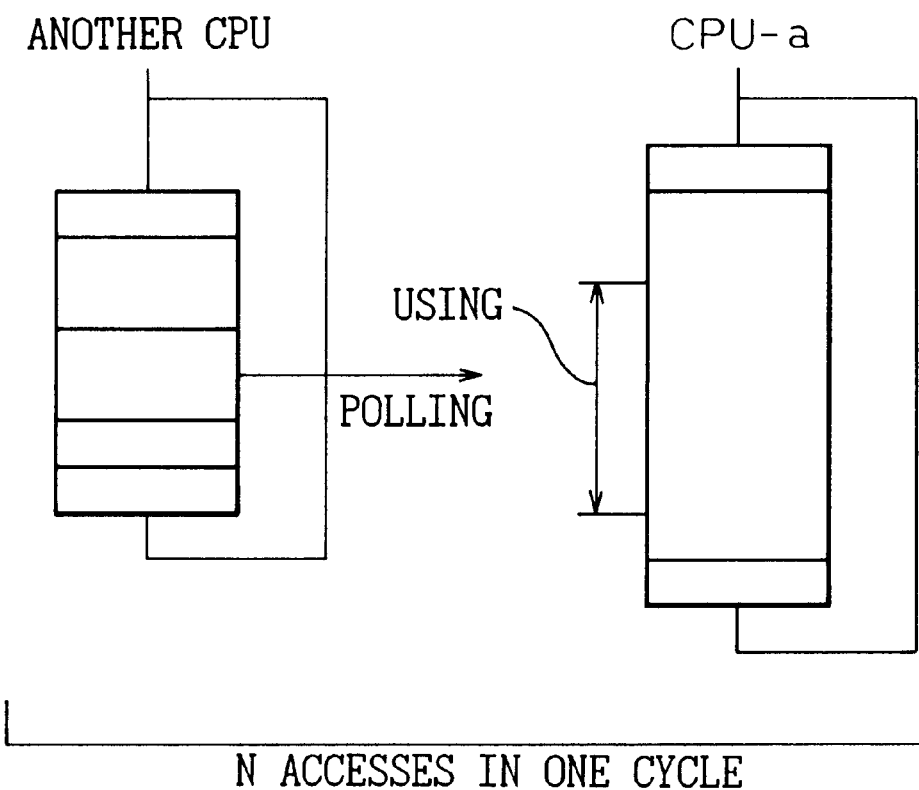
FIG. 3 explains live-lock occurring in the prior art.

The signal from the free-running counter 12 is passed through the OR gate 10 and is used as an update timing signal for the priority selector counter 8. This signal is asynchronous with the arbitration timing of the priority encoder 2. Even if the livelock of FIG. 3 due to an arbitration sequence occurs, the signal from the free-running counter 12 that is based on a prime-number frequency and is asynchronous with arbitration timing changes the priority patterns to resolve the livelock.

Figure 6:
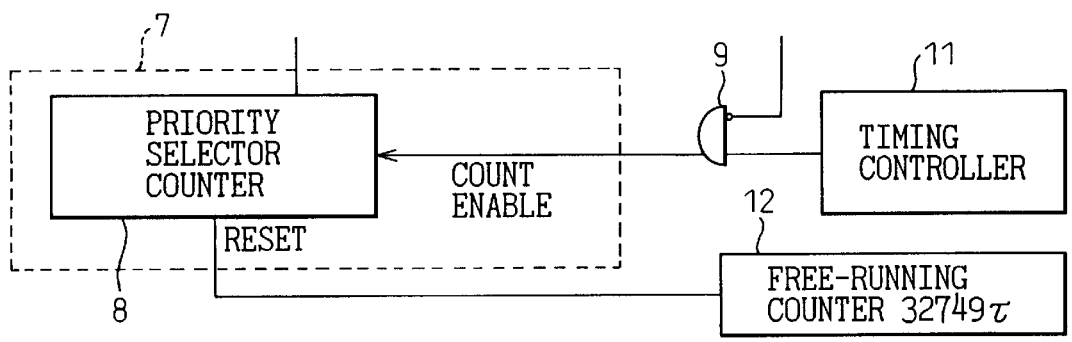
FIG. 6 shows a modification of a register of FIG. 4.

FIG. 6 shows a modification of the register 7.

In this modification, the output signal from the free-running counter 12 is supplied to a reset terminal of the priority selector counter 8 to zero the counter 8 asynchronously with the completion of arbitration by the priority encoder 2. Thereafter, the counter 8 is updated according to the predetermined order in response to a signal from the timing controller 11. This modification also resolves the live-lock due to an arbitration sequence. Instead of resetting the counter 8 to zero, it is possible to reset the counter 8 to a predetermined value.

If a request is masked due to competition with another request, the masked request receives the highest priority and the priority selector counter 8 is updated synchronously with the completion of arbitration, then the masked request having the highest priority will receive the lowest priority for the next arbitration. Inhibition circuit 3 is used to prevent this.

The inhibition circuit 3 of FIG. 4 has the eight AND gates 4 (4-0 to 4-7) for the request sources (or requests themselves) 0 to 7, respectively. The decoder 6 detects a request having the highest priority according to an output signal from the priority selector counter 8. Each AND gate 4 provides an output signal depending on whether the corresponding request is masked and whether the request has the highest priority. The output signals from the AND gates 4 are supplied to the OR gate 5, and the output of the OR gate 5 is supplied to the AND gate 9 through an inverter.

Upon detecting a request that is masked and has the highest priority, the inhibition circuit 3 inhibits the updating of the counter 8. Since the priority encoder 2 does not change the priority of any masked request having the highest priority, the masked request keeps the highest priority for the next arbitration.

The move-out enable signal to the AND gate 1-7 of FIG. 4 will be explained.

A request source may have a cache memory with a plurality of request lines, which are used depending on the priorities of accesses. Suppose the request source 0 uses a request line A for a read access for a cache move-in operation and a request line B for a write access for a cache move-out operation. In this case, the read access occurs before the write access in commands.

In FIG. 4, the request line A of the request source 0 is connected to the first AND gate 1-0, and the request line B thereof to the eighth AND gate 1-7. When arbitrating such a pair of read and write requests, the arbitration circuit masks the write request until the read request is processed. This is because the read request directly affects a program execution time.

Figure 7:
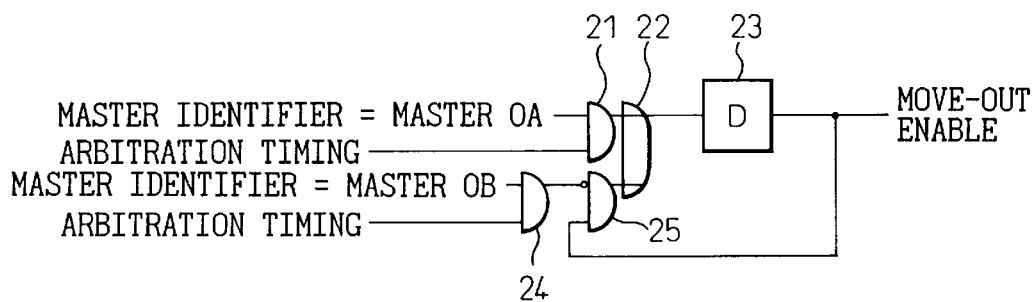
FIG. 7 shows a move-out enable signal generator according to another embodiment of the present invention.

FIG. 7 shows a circuit for generating the move-out enable signal to mask a write request until a read request is selected by arbitration.

A first AND gate 21 is turned on if the request source 0 provides a request through the request line A and if the request is selected by arbitration. Then, the output of the AND gate 21 sets a D-flip-flop (D-FF) 23 through an OR gate 22, and the D-flip-flop 23 provides the move-out enable signal.

A second AND gate 24 is turned on if the request source 0 provides a request through the request line B and if the request is selected by arbitration. The output of the AND gate 24 is supplied to a third AND gate 25 through an inverter. The AND gate 25 also receives the move-out enable signal. As a result, the move-out enable signal provided when the request through the request line A is selected lasts until the request through the request line B is selected. When the request through the request line B is selected, the move-out enable signal disappears.

Returning to FIG. 4, a move-in read request from the request source 0 through the request line A is sent to the first AND gate 1-0, and a move-out write request from the request source 0 through the request line B is sent to the eighth AND gate 1-7. In a normal operation, the move-out enable signal is not provided, and therefore, the eighth AND gate 1-7 is OFF. As a result, the move-in read request from the request source 0 is selected. Thereafter, the move-out enable signal is generated so that the move-out write request to the AND gate 1-7 is supplied to the priority encoder 2.

Namely, the move-out write request is masked until the move-in read request from the same request source is selected by arbitration. This means that the read request that directly affects a program execution time is processed first.

Some round robin arbitration circuits allow the number of functional modules such as CPUs and IO channels serving as request sources to be increased later. In this case, a round robin counter is prepared for a maximum number of functional modules so that an access right is evenly distributed to the functional modules after the number of functional modules is increased to the maximum. This, however, causes an unevenness in distributing an access right when the number of functional modules is less than the maximum.

Unevenness in distributing an access right to functional modules will now be explained.

Figure 8:
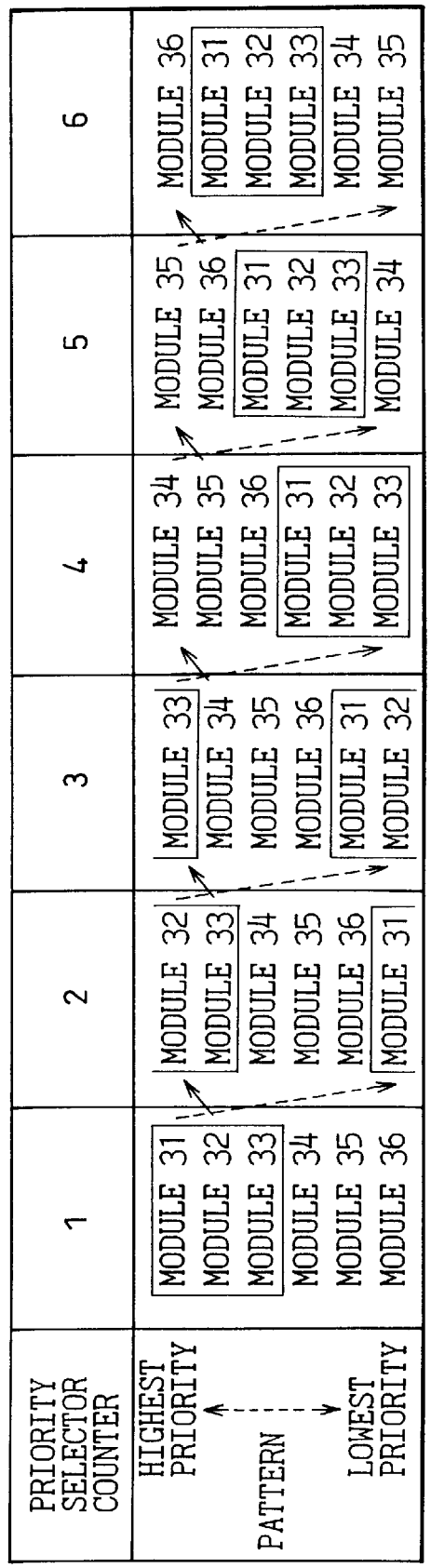
FIG. 8 shows a table of logic values in a priority encoder and explains unevenness in distributing an access right.

FIG. 8 shows an example of a table of logic values employed by a priority encoder. There are six functional modules serving as request sources. In this case, a priority selector counter takes one of values 1 to 6 so that one of six priority patterns is selected in rotation. Suppose that three functional modules 31 to 33 are actually installed. When the counter counts any one of 1 to 3, priorities assigned to the modules 31 to 33 change to evenly distribute an access right to the modules 31 to 33. When the counter counts one of 4 to 6, however, no change occurs in priorities assigned to the nodules 31 to 33.

In this way, the arbitration circuit that is ready for future additional installations is unable to evenly distribute an access right to requests when the arbitration circuit is structured to handle less than the maximum number of installations. To solve this problem, the embodiment mentioned below adjusts round robin counts depending on the number of actually installed functional modules and sets priority patterns accordingly, to secure an even distribution of an access right.

Figure 9:
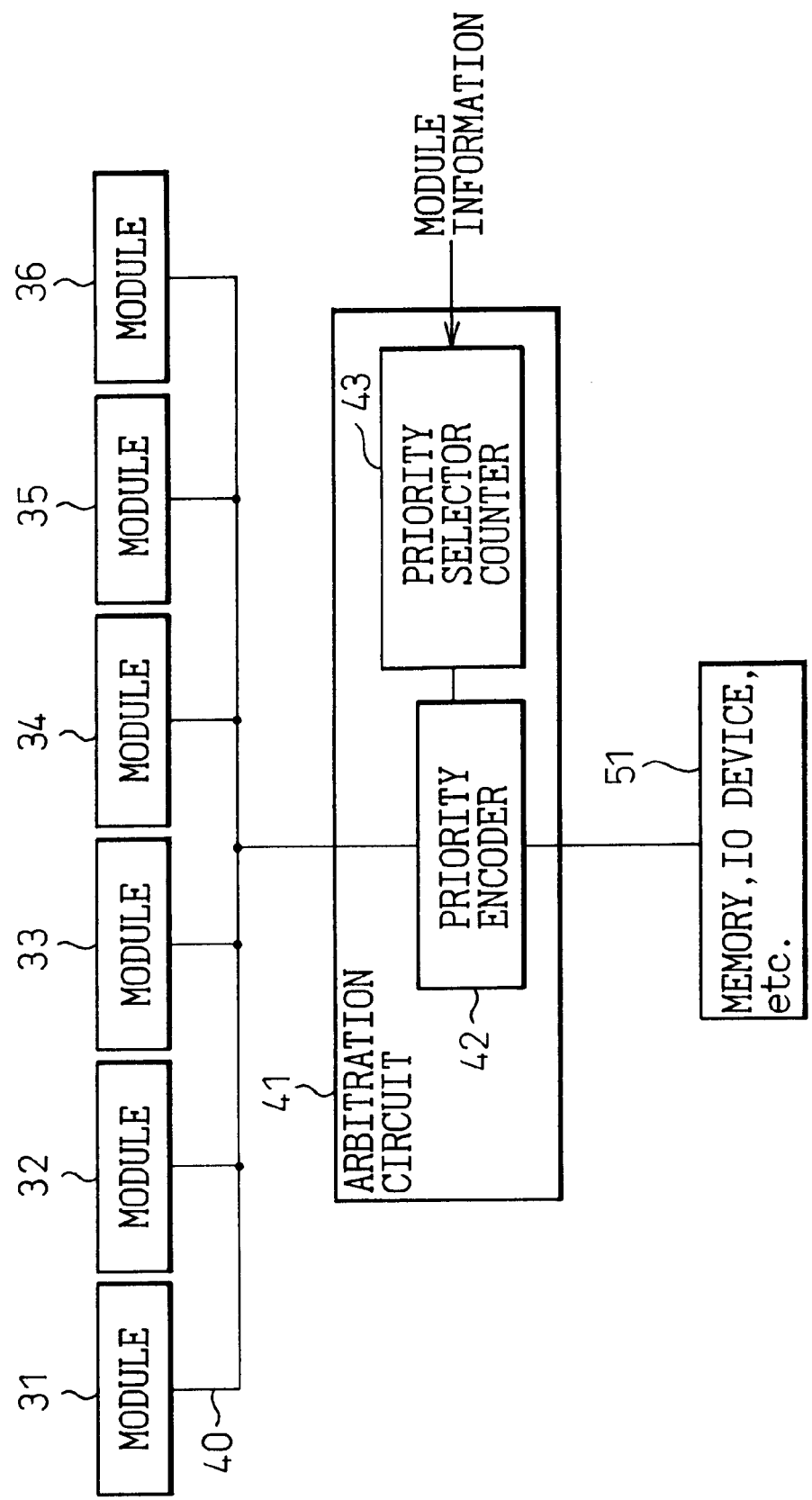
FIG. 9 shows an information processor according to still another embodiment of the present invention.

FIG. 9 shows an information processor according to the embodiment.

Functional modules 31 to 36 serving as request sources issue requests to an arbitration circuit 41 through a bus 40. An installable maximum of functional modules is six. This number is not particularly limited but is optional. The arbitration circuit 41 has a priority encoder 42 and a priority selector counter 43. The information processor further has a resource 51 which may be a memory or an IO device.

The counter 43 receives module information (a mode signal) to cope with a change in the number of functional modules installed. The mode signal is "1" when all of the modules 31 to 36 are installed and is "0" when only the modules 31 to 33 are installed. According to the mode signal, assigning priorities to requests is optimized for any one of the 3-module and 6-module configurations.

Figures 10, 11:
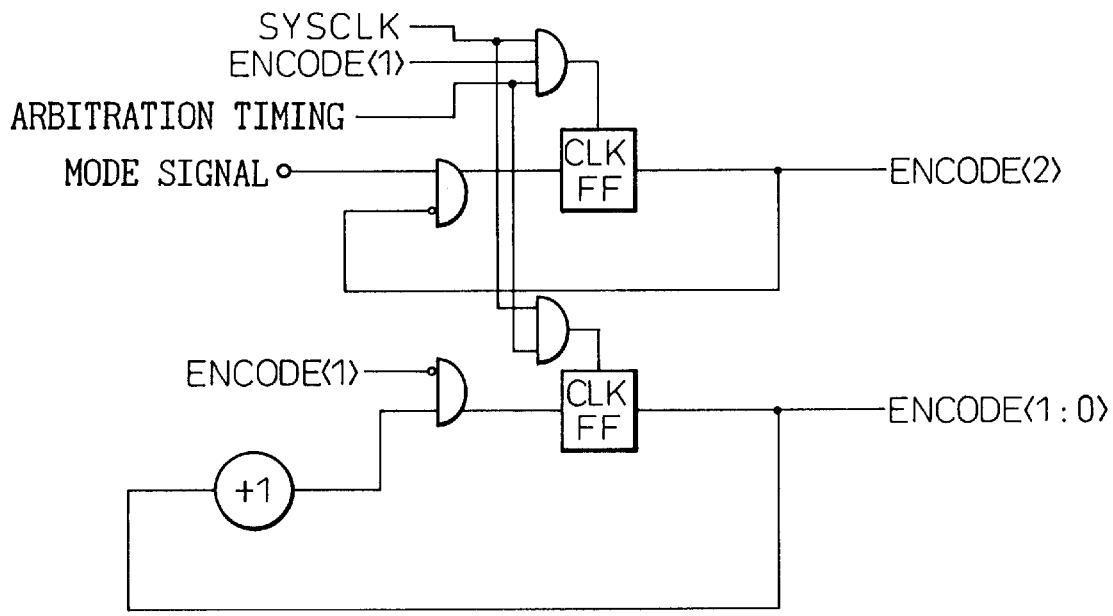
FIG. 10 shows a priority selector counter of FIG. 9.
FIG. 11 shows an encode table employed by the counter of FIG. 10.

FIG. 10 shows the structure of the priority selector counter 43.

The mode signal is "1" or "0", depending on the number of functional modules actually installed. The counter 43 provides an output signal ENCODE<2:0> to specify a priority pattern to be selected by the priority encoder 42. The counter 43 operates on a clock signal SYSCLK. An arbitration timing signal becomes "1" at arbitration timing. Each flip-flop operates in response to a fall of the clock signal.

FIG. 11 shows an encode table employed by the counter 43. A count value in the counter 43 is one of 1 to 6 depending on the signal ENCODE<2:0>. The priority encoder 42 selects a priority pattern according to the count value in the counter 43.

The mode signal of FIG. 10 is used to mask the highest bit <2> of the signal ENCODE <2:0> of the counter 43, so that the counter 43 may serve as a 2-bit ternary counter or a 3-bit 6-number counter. If the mode signal is "1," the highest bit <2> is not masked, and the counter 43 takes one of 1 to 6. If the mode signal is "0," the highest bit <2> is masked, and the counter 43 takes one of 1 to 3.

FIG. 12a and FIG. 12b show relationships between count values in the counter 43 and priority patterns to be selected by the priority encoder 42.

FIG. 12a is for the mode signal of "1." In this case, the counter 43 counts one of 1 to 6, and one of six priority patterns is selected in sequence to secure even access for the six functional modules 31 to 36. If the mode signal is "0" to indicate that the functional modules 31 to 33 are installed, FIG. 12b is used. In this case, the counter 43 repeats among 1 to 3, and first three of the six priority patterns of the table (a) are used in sequence. As a result, priorities assigned to the functional modules 31 to 33 are changed according to the three priority patterns. Even if the number of actually installed functional modules is less than the maximum, an access right is evenly distributed to the modules.

As explained above, the present invention arbitrates competing requests without livelock or deadlock. The present invention conducts no useless arbitration, adjusts round robin counts according to the number of actually installed modules, and selects a priority pattern based on a count, thereby evenly distributing an access right to requests from the functional modules.

What is claimed is:

1. An arbitration circuit for arbitrating N requests, comprising:
   a memory circuit storing one of N values;
   a priority circuit selecting one of N priority patterns according to the value in the memory circuit and assigning a priority to each of the requests based on the selected priority pattern, thereby prioritizing the requests;
   a first circuit updating the selected value in the memory circuit in a predetermined order synchronously with the prioritization; and
   a second circuit updating the selected value in the memory circuit in the predetermined order at regular intervals that are asynchronous with the prioritization.

2. The arbitration circuit of claim 1, further comprising:
   a gate circuit arranged for each of the N requests, passing the corresponding request to the priority circuit if the request is addressed to the arbitration circuit and if the request is not masked.

3. The arbitration circuit of claim 1, wherein the priority circuit selects one of the N priority patterns so that a request having the highest priority before arbitration may have the lowest priority after the arbitration.

4. An arbitration circuit for arbitrating N requests, comprising:
   a memory circuit storing one of N values;
   a priority circuit selecting one of N priority patterns according to the value in the memory circuit and assigning a priority to each of the requests based on the selected priority pattern, thereby prioritizing the requests;
   a first circuit updating the selected value in the memory circuit in a predetermined order synchronously with the prioritization; and
   a second circuit updating the selected value in the memory circuit to the predetermined value at regular intervals that are asynchronous with the prioritization.

5. The arbitration circuit of claim 4, further comprising:
   a gate circuit, arranged for each of the N requests, passing the corresponding request to the priority circuit if the request is addressed to the arbitration circuit and if the request is not masked.

6. The arbitration circuit of claim 4, wherein the priority circuit selects one of the N priority patterns so that a request having the highest priority before arbitration may have the lowest priority after the arbitration.

7. The arbitration circuit of claim 4, wherein the predetermined value is 0.

8. An arbitration circuit for arbitrating N requests, comprising:
   a memory circuit storing one of N values;
   a priority circuit selecting one of N priority patterns according to the value in the memory circuit and assigning a priority to each of the requests based on the selected priority pattern, thereby prioritizing the requests;
   a circuit updating the value selected in the memory circuit in a predetermined order synchronously with the prioritization; and
   an inhibition circuit inhibiting the updating of the value in the memory circuit if the requests involve a masked request and if the highest priority is assigned to the masked request by the prioritization.

9. The arbitration circuit of claim 8, further comprising:
   a gate circuit, arranged for each of the N requests, passing the corresponding request to the priority circuit if the request is addressed to the arbitration circuit and if the request is not masked.

10. The arbitration circuit of claim 8, wherein the priority circuit selects one of the N priority patterns so that a request having the highest priority before arbitration may have the lowest priority after the arbitration.

11. The arbitration circuit of claim 8, wherein the inhibition circuit has a circuit detecting the request that receives the highest priority according to the value in the memory-circuit.

12. The arbitration circuit of claim 8, wherein the inhibition circuit has a circuit, arranged for each of the N requests, providing a signal to inhibit the updating of the value in the memory circuit if the corresponding request is addressed to the arbitration circuit, is masked, and receives the highest priority.

13. The arbitration circuit of claim 8, further comprising:
   a circuit masking a second request until a first request is selected by arbitration, when the second request is dependent upon the completion of the first request, wherein the value in the memory circuit is updated after arbitration while the second request is being masked.

14. An arbitration circuit for arbitrating a group of requests numbering at most N requests, comprising:
   a memory circuit storing one of a group of values equal in number to the number of requests to arbitrate;
   a priority circuit selecting one of N priority patterns according to the value in the memory circuit and assigning a priority to each of the requests based on the selected priority pattern, thereby prioritizing the requests; and
   a control circuit controlling the value in the memory circuit to not select any priority pattern that assigns the highest priority to a request source that is not installed.

15. The arbitration circuit of claim 14, further comprising:
   a gate circuit, arranged for each of the group of requests, passing the corresponding request to the priority circuit if the request is addressed to the arbitration circuit and if the request is not masked.

16. The arbitration circuit of claim 14, wherein the priority circuit selects one of the N priority patterns so that a request having the highest priority before arbitration may have the lowest priority after the arbitration.

17. The arbitration circuit of claim 14, wherein the control circuit receives module information that is based on a number of installed request sources, and changes a range of the values to be set in the memory circuit according to the module information so that no priority pattern that assigns the highest priority to a request source that is not installed is selected.

18. An arbitration device for arbitrating requests from multiple devices, comprising:
   a priority circuit selecting a pattern according to a stored value; and a circuit updating the value based on a predetermined order such that a request is selected even when masked due to a preceding request or controlling conditions.

19. A method of arbitrating requests from multiple devices, comprising:

selecting a pattern according to a stored value; and updating the value based on a predetermined order such that a request is selected even when masked due to a preceding request or controlling conditions.

20. A method of arbitrating N requests, comprising:

storing one of N values;

selecting one of N priority patterns according to the stored value, and assigning a priority to each of the requests based on the selected priority pattern, thereby prioritizing the requests;

updating the selected value in a predetermined order synchronously with the prioritization; and updating the selected value in the predetermined order at regular intervals that are asynchronous with the prioritization.

21. A method of arbitrating N requests, comprising:

storing one of N values;

selecting one of N priority patterns according to the stored value, and assigning a priority to each of the requests based on the selected priority pattern, thereby prioritizing the requests;

updating the selected value in a predetermined order synchronously with the prioritization; and inhibiting the updating of the value if the requests involve a masked request and if the highest priority is assigned to the masked request by the prioritization.

22. A method of arbitrating a maximum of N requests, comprising:

storing a value for each of the requests;

selecting for each of the requests one of N priority patterns according to the stored value for the request, and assigning a priority to the request based on the selected priority pattern, thereby prioritizing the requests; and controlling the value to prevent selecting a priority pattern that assigns the highest priority to a request source that is not installed.

23. A computer-readable medium encoded with a program for arbitrating requests from multiple devices, said program comprising procedures for:

selecting a pattern according to a stored value; and updating the value based on a predetermined order such that a request is selected even when masked due to a preceding request or controlling conditions.

24. A computer-readable medium encoded with a program for arbitrating N requests, said program comprising procedures for:

storing one of N values;

selecting one of N priority patterns according to the stored value, and assigning a priority to each of the requests based on the selected priority pattern, thereby prioritizing the requests;

updating the selected value in a predetermined order synchronously with the prioritization; and updating the selected value in the predetermined order at regular intervals that are asynchronous with the prioritization.

25. A computer-readable medium encoded with a program for arbitrating N requests, said program comprising procedures for:

storing one of N values;

selecting one of N priority patterns according to the stored value, and assigning a priority to each of the requests based on the selected priority pattern, thereby prioritizing the requests;

updating the selected value in a predetermined order synchronously with the prioritization; and inhibiting the updating of the value if the requests involve a masked request and if the highest priority is assigned to the masked request by the prioritization.

26. A computer-readable medium encoded with a program for arbitrating a maximum of N requests, said program comprising procedures for:

storing a value for each of the requests;

selecting for each of the requests one of N priority patterns according to the stored value for the request, and assigning a priority to the request based on the selected priority pattern, thereby prioritizing the requests; and controlling the value to prevent selecting a priority pattern that assigns the highest priority to a request source that is not installed.

* * * * *

UNITED STATES PATENT AND TRADEMARK OFFICE
CERTIFICATE OF CORRECTION

PATENT NO.: 6,029,219
DATED : February 22, 2000
INVENTOR(S): Masatoshi MICHIZONO et al.

It is certified that error appears in the above-identified patent and that said Letters Patent is hereby corrected as shown below:

Col. 9, line 29, after "circuit" insert --,--.

Signed and Sealed this

Fourteenth Day of November, 2000

Attest:

Q. TODD DICKINSON

*Attesting Officer*  *Director of Patents and Trademarks*